June 29, 1965  L. T. FUQUA ETAL  3,191,455
REMOTELY CONTROLLED REAR-VIEW MIRROR
Filed April 16, 1963  2 Sheets-Sheet 1
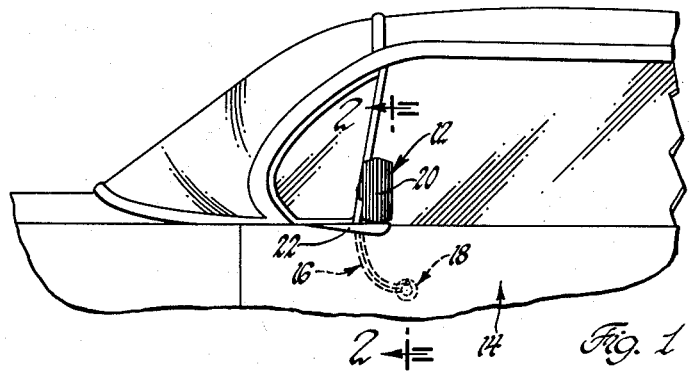
Fig. 1
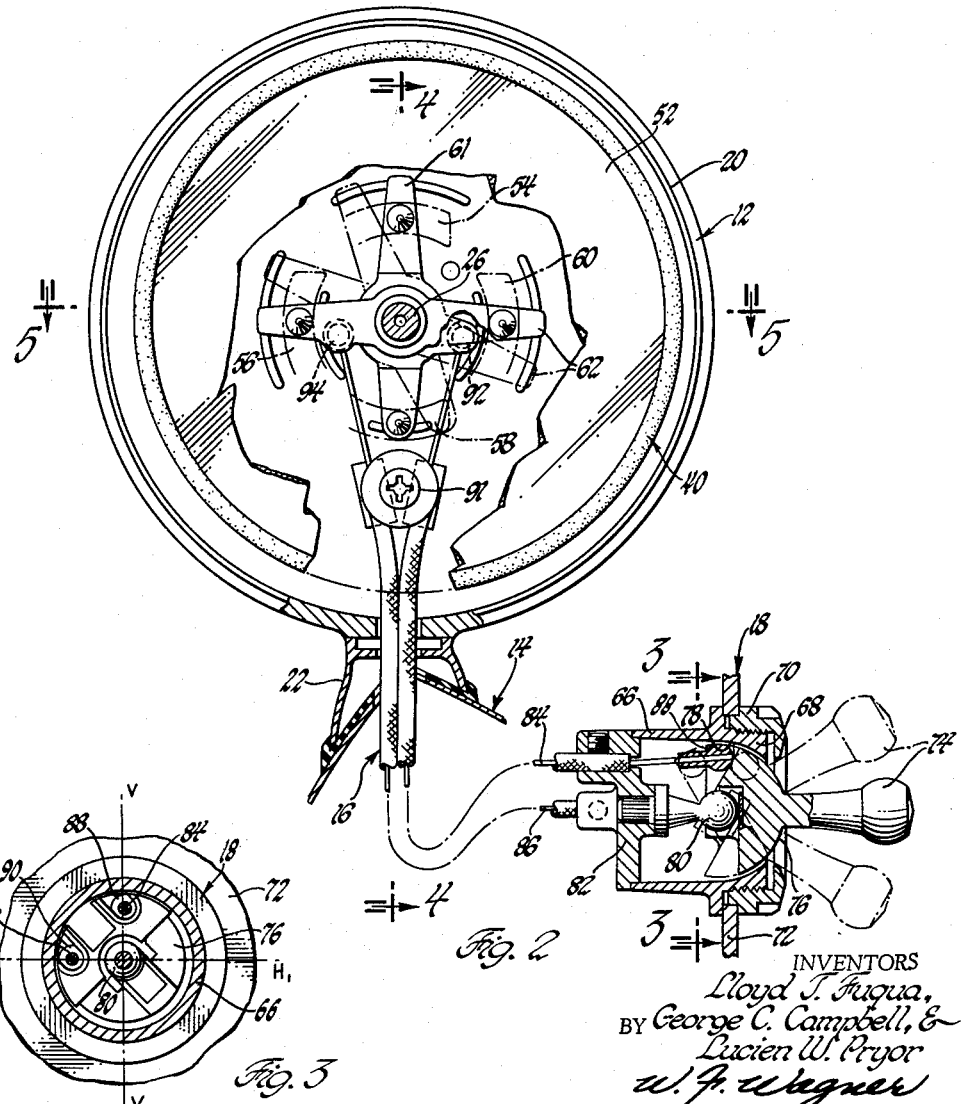
Fig. 2
Fig. 3
INVENTORS
Lloyd T. Fuqua,
BY George C. Campbell, &
Lucien W. Pryor
W. F. Wagner
ATTORNEY June 29, 1965 L. T. FUQUA ETAL 3,191,455
REMOTELY CONTROLLED REAR-VIEW MIRROR
Filed April 16, 1963 2 Sheets-Sheet 2

INVENTORS
Lloyd T. Fuqua,
BY George C. Campbell, &
Lucien W. Pryor

ATTORNEY

United States Patent Office 3,191,455
Patented June 29, 1965

3,191,455
REMOTELY CONTROLLED REAR-VIEW MIRROR
Lloyd T. Fuqua, Fortville, George C. Campbell, Middletown, and Lucien W. Pryor, Anderson, Ind., assignors to General Motors Corporation, Detroit, Mich., a corporation of Delaware
Filed Apr. 16, 1963, Ser. No. 273,356
9 Claims. (Cl. 74—501)

The present invention relates to a rear view mirror that can be mounted exteriorly on an automotive vehicle and is angularly adjustable for a desired rear view by a remotely located operating lever.

Many present day automotive vehicles are equipped with a remotely controlled rear view mirror mechanism which includes an adjustable mirror support movable through a plurality of tensioned cables. Typically, a mechanism of this sort has one end of each cable directly connected to the mirror support and the other end fixed to a remotely located actuator so that upon pivotal movement of the latter in a certain direction, the mirror support is moved in a corresponding direction. Mirror mechanisms of this type have gained wide acceptance, however, inasmuch as the cable, and at times a spring, constitute the only support means for holding the mirror in an adjusted position, a problem arises in preventing the mirror from moving out of an adjusted position as a result of vehicle vibrations or some forceful accidental encounter.

Accordingly, the present invention contemplates a cable-operated remotely controlled mechanism that alleviates the above-mentioned problem by incorporating positive drive means which serve as a substantially rigid support for maintaining the mirror in any adjusted position and, in addition, provide for the selective adjustment of the mirror. More specifically this is accomplished by a mechanism which comprises a housing that universally pivotally supports a rear view mirror and a pair of independently movable members that engage the mirror. First and second cables are respectively connected at one end to the members while the other end of each cable is fixed to a remotely located operating lever. The cables are secured to the lever at spaced points so as to permit movement of one or the other of the members for positioning the mirror about mutually perpendicular pivot axes, and to provide concurrent movement of both members for positioning the mirror about axes located between the mutually perpendicular axes.

Figure 4:
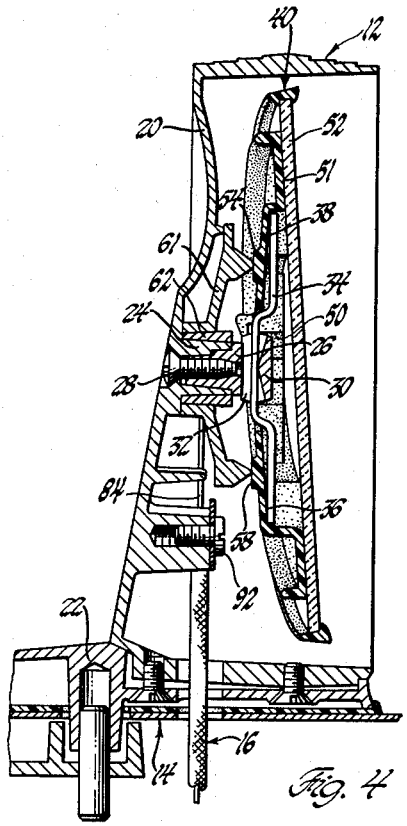
Figure 5:
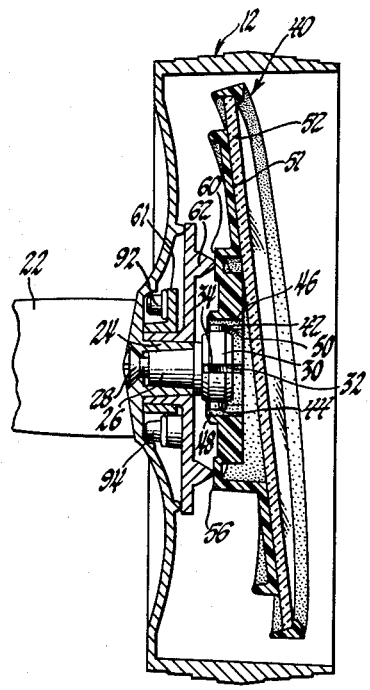
Figure 6:
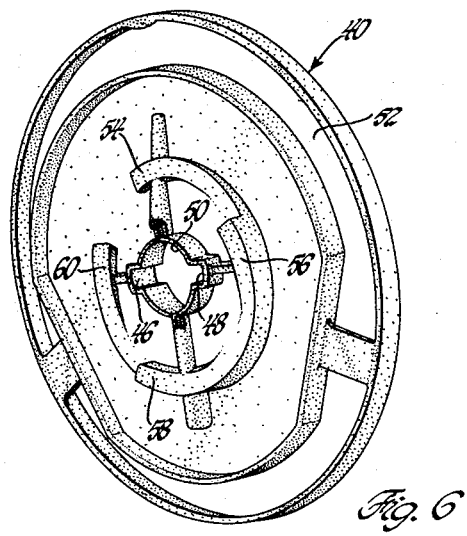
Figure 7:
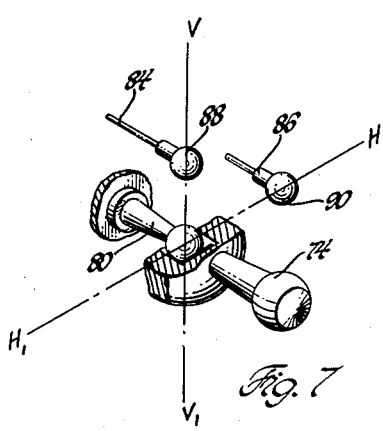

A more complete understanding of the invention can be derived from the following detailed description with reference to the drawings in which:

FIG. 1 is a fragmentary view of a vehicle incorporating a rear view mirror mechanism incorporating the present invention, FIG. 2 is an enlarged view partially in section taken on lines 2—2 of FIG. 1, FIG. 3 is a view taken on lines 3—3 of FIG. 2, FIG. 4 is a section taken on lines 4—4 of FIG. 2, FIG. 5 is a section taken on lines 5—5 of FIG. 2, FIG. 6 is a perspective view illustrating the rear portion of the mirror support, and FIG. 7 is a perspective view illustrating the relative positions of the cable mounts and operating knob with respect to vertical and horizontal axes.

Referring now to the drawings and particularly FIG. 1, a portion of a vehicle is shown having a mirror mechanism 12 made in accordance with the present invention and fastened to the exterior portion of a vehicle door 14. As will become more apparent as the description proceeds, the mirror mechanism 12 is operated through a plurality of cables 16 connected to a manually-operable actuator 18 which is fastened to the inside of the door trim panel. It should be understood that this arrangement is for illustrative purposes only and the mirror mechanism can be positioned on the vehicle fender rather than the door and the actuator may be mounted on the instrument panel or any other readily accessible position within comfortable reach of the vehicle operator.

As shown in FIGS. 2–6 the mirror mechanism 12 comprises an outer cylindrical housing 20 anchored to a mounting bracket 22, which in turn is secured to the sheet metal of the vehicle door 14. The housing is provided with an inwardly extending boss 24 that is centrally located within the housing and serves to accommodate a stud 26. The stud is provided with a threaded bore which at one end receives a screw 28 for rigidly fixing the stud to the housing. The other end of the stud is formed with a spherical head 30 which includes a slot 32 that transversely passes through the head and serves to accommodate a pre-bent connecting wire 34, the ends of which fit into grooves 36 and 38 formed in a mirror support generally indicated as 40. Additionally, the head 30 is provided with a pair of laterally extending lugs 42 and 44 that respectively mate with channels 46 and 48 formed adjacent the circular opening 50 in the mirror support 40. Thus, in the assembled form shown, the head 30 fits within the opening 50 and serves to universally pivotally carry the mirror support 40 with the lugs 42 and 44 providing both a means of positioning the mirror support onto the head and preventing relative rotation therebetween. Moreover, the connecting wire 34 locks the mirror support to the stud without causing any interference therebetween and it is significant that the diameter of the lugs is sufficiently less than the channel size so as to permit universal mirror support movement without creating any jamming effect.

As best seen in FIGURES 5 and 6, the mirror support 40 is preferably made from a plastic material and is formed with a flat seating portion 51 against which the rear of a mirror element 52 rests. The mirror support has a plurality of cam followers in the form of ramps 54, 56, 58 and 60 integrally formed on the rear of the support, and includes an annular lip formed adjacent the periphery thereof which cooperates with the seating portion 51 for securely holding the mirror element in position. The seating portion 51 lies in an inclined plane so as to normally direct the reflecting surface of the mirror element toward the vehicle operator while the ramps are located on a circle concentric with the opening 50 for reasons which will be more fully understood as the description of the invention proceeds.

In order to positively position the mirror support for the desired rear view, a pair of cam supports 61 and 62 are rotatably mounted about the boss 24. Each cam support has a pair of radially extending arms each of which is formed with an integral projection or cam for engaging one of the ramps on the mirror support. As seen in FIGURES 4 and 5, the projections extending from the cam supports 61 and 62 respectively engage the ramps 54, 58 and 56, 60. Thus, where the cam supports are in the full line positions of FIGURE 2, each of the projections engages its associated ramp at a point intermediate the latter's low and high point. However, assuming the cam support 62 is rotated clockwise to the position indicated by the phantom lines and cam support 61 holds the full line position, the cam engaging ramp 60 will move to the low point thereof while the cam engaging ramp 56 will move to the high point of the latter resulting in a pivotal movement of the mirror support about a vertical axis so that the left side of the mirror moves out of the plane of the drawing sheet toward the observer. Counter-clockwise movement of cam support 62 causes the mirror support to be pivoted about the vertical axis in an opposite direction so that in this instance the right side of the mirror would move toward the observer. Similarly, assuming cam support 62 is in the full line position of FIGURE 2 and cam support 61 is rotated counterclockwise to the phantom line position or clockwise, the mirror support would pivot upwardly or downwardly about a horizontal axis. Where both cam supports 61, 62 are moved concurrently to the phantom line positions indicated in FIGURE 2, the mirror support would be pivoted about an axis inclined to the horizontal.

The operating mechanism for achieving relative and concurrent movement of the cam supports, as described above, is shown in detail in FIG. 2 and comprises a cylindrical housing 66 terminating at one end with a threaded boss 68 for receiving a clamping ring 70 which rigidly mounts the housing to a support such as the trim panel 72. A hand-operated knob 74 is universally mounted in the housing 66 by a spherical portion 76 that is accommodated by a spherical seating surface 78 formed adjacent the boss 68. A ball stud 80 is fixed to a plate 82 secured at the inner end of the housing 66 and serves as a pivot point about which the knob 74 is movable. A pair of wires 84 and 86, adapted to act in compression and tension, terminate at one end with balls 88 and 90 respectively, each of which is receivable in an appropriate socket formed in the actuator knob. Each wire is enveloped by a sheath within which the wire is freely slidable inasmuch as the actuator end of each sheath is rigidly held in position relative to the plate 82 by set screws while other ends are fixed with the housing 20 by a screw and washer combination 91. The opposite ends of the wires 84 and 86 are respectively connected to the studs 92 and 94, which in turn are respectively fixed with the cam supports 61 and 62. Thus, it should be apparent that in response to movement of the actuator knob, one or both of the wires is moved within their respective sheaths to cause rotational movement of the cam supports.

FIG. 7 illustrates in perspective the relative positions of the balls 88 and 90 fixed to the operating wires, and the ball stud 80 about which the actuator knob 74 pivots. As shown, it should be noted the vertical axis V, $V_1$ and horizontal axis H, $H_1$ intersect at the ball center of the ball stud. Moreover, the center of the ball 88 is located on the vertical axis V, $V_1$ and the center axis of ball 90 is located on the horizontal axis H, $H_1$. With this arrangement, when the actuator knob is moved up and down in a vertical plane it pivots about the horizontal axis H, $H_1$ and moves the ball 88 forwardly and rearwardly. Inasmuch as the ball 90 is located on the horizontal axis H, $H_1$ it remains stationary during this movement. In contradistincition, when the actuator knob is pivoted sideways about the vertical axis V, $V_1$, the ball 88 remains stationary and the ball 90 moves forwardly and rearwardly. It should be apparent that upon movement of the actuator knob in a plane located between the vertical and horizontal axes as, for example to a position between $V_1$ and $H_1$, both balls 88 and 90 would move rearwardly and cause a drawing action on the associated wires. Of course, movement of the actuator to positions between the main horizontal and vertical axes brings about the same result. This arrangement is significant to the rear view mirror mechanism described above in that it enables the latter to be operated and adjusted to all positions by the use of only two wires.

In operating the above-described construction, the vehicle operator need only grasp the actuator knob 74 and move it to a predetermined position for realizing a corresponding movement of the mirror support 40. For example, assuming it is desired to adjust the mirror element sideways, the actuator is moved in a horizontal plane about the vertical axis V, $V_1$ causing movement of wire 86 which results in rotaton of cam support 62. As described above, the projecting cams on cam support 62 move along the ramps 56 and 60 to tilt the mirror support sideways about a vertical axis. Likewise, movement of the actuator knob in a vertical plane about a horizontal axis H, $H_1$, causes the wire 84 to move and rotate the cam support 61, the projections of which engage the ramps 54 and 58. Finally, as aforementioned, movement of the actuator to positions located between the mutually perpendicular axes causes movement of both wires and accordingly rotation of both cam supports so as to position the mirror support about axes located between the mutually perpendicular axes.

Although one embodiment of the subject invention is described above, it should be apparent that various changes and alterations can be made without departing from the spirit of the invention. These changes and alterations are contemplated by the inventors and they do not intend to be limited except by the scope of the appended claims.

What is claimed is:

1. A remotely controlled rear view mirror, comprising a housing, a mirror support, means universally pivotally supporting the mirror support on the housing, first and second members mounted on the housing for independent movement relative to the housing, cooperating camming means formed with the mirror support and said members for pivoting the mirror support about said means upon movement of the members relative to the housing, an actuator remotely located from the housing, means supporting the actuator for universal pivotal movement, a first and second flexible cable connected at one end thereof to said first and second members respectively, the other end of said cables connected to the actuator at spaced points separated an angular distance of substantially 90° so that pivotal movement of the latter in a vertical plane causes one of said members to be moved to pivot the mirror support about a first axis and pivotal movement of the actuator in a horizontal plane causes the other of said members to be moved to pivot the mirror support about a second axis perpendicular to the first axis while pivotal movement of the actuator to positions between said planes causes simultaneous movement of said members to pivot the mirror support about axes located between the first and second axis.

2. A remotely controlled rear view mirror, comprising a housing, a mirror support, means universally pivotally supporting the mirror support on the housing, first and second members mounted on the housing for independent rotation about an axis passing through said means, cooperating camming means formed with the mirror support and said members for moving the mirror support about said means upon rotation of the members relative to the housing, an actuator remotely located from the housing, means supporting the actuator for universal pivotal movement, a first and second flexible cable connected at one end thereof to said first and second members respectively, the other end of said cables connected to the actuator at spaced points separated an angular distance of substantially 90° so that pivotal movement of the latter in a vertical plane causes one of said members to be rotated to pivot the mirror support about a first axis and pivotal movement of the actuator in a horizontal plane causes the other of said members to be rotated to pivot the mirror support about a second axis perpendicular to the first axis while pivotal movement of the actuator to positions between said planes causes simultaneous rotation of said members to pivot the mirror support about axes located between the first and second axis.

3. A remotely controlled rear view mirror, comprising a housing, a mirror support, means universally pivotally supporting the mirror support on the housing, quadrantal ramps formed on the mirror support, first and second members mounted on the housing for independent movement, projections formed on each of said members for engaging said ramps, operating means including an actuator, means for supporting the actuator for universal pivotal movement, a first and second cable respectively connected at one end thereof to said first and second members, the other end of said cables connected to the actuator at points separated at an angular distance of substantially 90° so that movement of the actuator in a vertical plane causes one of said members to be moved so that the associated projections of said one of said members move along one pair of said ramps to pivot the mirror support about a first axis, and movement of the actuator in a horizontal plane causes the other of said members to be moved so that the associated projections of said other of said members move along the other pair of said ramps to pivot the mirror support about a second axis perpendicular to the first axis while movement of the actuator to positions between the horizontal and vertical planes causes both of the members to be moved so that the projections thereof move along both pairs of said ramps simultaneously to pivot the mirror support about axes located between the first and second axis.

4. A remotely controlled rear view mirror, comprising a housing, a mirror support, means universally pivotally supporting the mirror support on the housing, quadrantal ramps formed on the mirror support and lying on a circle having its center passing through an axis of said means, first and second members mounted on the housing for independent rotation about said means, a pair of radially extending arms formed with each of said members, a projection formed on each of said arms for engaging one of said ramps, operating means including an actuator, means for supporting the actuator for universal pivotal movement, a first and second cable respectively connected at one end thereof to said first and second members, the other end of said cables terminating with a ball, a pair of sockets formed in the actuator at points offset from the longitudinal axis of the actuator and accommodating said balls, said sockets being spaced an angular distance of substantially 90° so that movement of the actuator in a vertical plane causes one of said members to be rotated so that the associated projections of said one of said members move along one pair of said ramps to pivot the mirror support about a first axis, and movement of the actuator in a horizontal plane causes the other of said members to be rotated so that the associated projections of said other of said members move along the other pair of said ramps to pivot the mirror support about a second axis perpendicular to the first axis while movement of the actuator to positions between the horizontal and vertical planes causes both of the members to be rotated so that the projections thereof move along both pairs of said ramps simultaneously to pivot the mirror support about axes located between the first and second axis.

5. A remotely controlled rear view mirror, comprising a housing, a mirror support, means universally pivotally supporting the mirror support on the housing, quadrantal ramps formed on the mirror support and lying on a circle having its center passing through an axis of said means, first and second members mounted on the housing for independent rotation about said axis, projections formed on each of said members for engaging diametrically opposite pairs of said ramps, operating means including an actuator, means for supporting the actuator for universal pivotal movement, a first and second cable respectively connected at one end thereof to said first and second members, the other end of said cables connected to the actuator at points offset from the longitudinal axis of the actuator, said points being spaced an angular distance of substantially 90° and being so located on the actuator that movement of the actuator in a vertical plane causes one of said members to be rotated so that the associated projections of said one of said members move along one pair of said ramps to pivot the mirror support about a first axis, and movement of the actuator in a horizontal plane causes the other of said members to be rotated so that the associated projections of said other of said members move along the other pair of said ramps to pivot the mirror support about a second axis perpendicular to the first axis while movement of the actuator to positions between the horizontal and vertical planes causes both of the members to be rotated so that the projections thereof move along both pairs of said ramps simultaneously to pivot the mirror support about axes located between the first and second axis.

6. A remotely controlled rear view mirror, comprising a housing, a mirror support, a stud having a spherical head fixed to said housing, a passage extending through said head with its axis transverse to the longitudinal axis of said stud, a socket portion formed in the mirror support and accommodating said head so as to provide universal pivotal movement of the mirror support, means extending through said passage for connecting the mirror support to the stud, cooperating stop means formed on the stud and mirror support for preventing rotation of the latter about the longitudinal axis of said stud, quadrantal ramps formed on the mirror support and lying on a circle having its center at said longitudinal axis, first and second members mounted on the housing for independent rotation about said axis, projections formed on each of said members for engaging diametrically opposite pairs of said ramps, operating means including an actuator, means for supporting the actuator for universal pivotal movement, a first and second cable respectively connected at one end thereof to said first and second members, the other end of said cables connected to the actuator at points offset from the longitudinal axis of the actuator, said points being spaced an angular distance of substantially 90° and being so located on the actuator that movement of the actuator in a vertical plane causes one of said members to be rotated so that the associated projections of said one of said members move along one pair of said ramps to pivot the mirror support about a first axis, and movement of the actuator in a horizontal plane causes the other of said members to be rotated so that the associated projections of said other of said members move along the other pair of said ramps to pivot the mirror support about a second axis perpendicular to the first axis while movement of the actuator to positions between the horizontal and vertical planes causes both of the members to be rotated so that the projections thereof move along both pairs of said ramps simultaneously to pivot the mirror support about axes located between the first and second axis.

7. A remotely controlled rear-view mirror mechanism comprising, a housing, a mirror support having a front portion and a rear portion, means universally pivotally supporting the mirror support on the housing, first and second members mounted on the housing for rotation about an axis passing through said means, quadrantal ramps formed on said rear portion, each of said members engaging a pair of said ramps and movable relative thereto for positioning the mirror support relative to the housing, first and second axially displaceable means for imparting rotation to said first and second members, and manually operated universally pivotally supported means for simultaneously imparting axial movement to said first and second axially displaceable means.

8. A remotely controlled rear view mirror comprising, a housing, a mirror support, means universally pivotally supporting the mirror support on the housing, quadrantal ramps formed on the mirror support about a center passing through an axis of said means, first and second members mounted on the housing for independent rotation about said axis, each of said members having arms engaging diametrically opposite pairs of said ramps, first and second axially displaceable means for imparting rotation to said first and second members, and manually operated universally pivotally supported means for selectively imparting axial movement to said first and second axially displaceable means.

9. A remotely controlled rear-view mirror comprising, a housing, a mirror support, means universally pivotally supporting the mirror support on the housing, first and second members mounted on the housing for independent rotation about an axis passing through said means, cooperating camming means formed with the mirror support and said members for moving the mirror support about said means upon rotation of the members, first and second axially displaceable means for imparting rotation to said first and second members, and manually operated universally pivotally supported means for selectively and simultaneously imparting axial movement to said first and second axially displaceable means.

References Cited by the Examiner

UNITED STATES PATENTS

| | | | |
|---|---|---|---|
| 2,855,825 | 10/58 | Feder | 88—93 |
| 2,856,817 | 10/58 | Garden | 88—93 |
| 2,931,245 | 4/60 | Jacobsen | 88—93 X |

BROUGHTON G. DURHAM, *Primary Examiner.*

MILTON KAUFMAN, *Examiner.*